United States Patent [19]
Bramley

[11] 3,950,584
[45] Apr. 13, 1976

[54] COMPOSITE NET

[76] Inventor: Anthony Bramley, Gosford House, Gosford, Kidlington, Oxfordshire, England

[22] Filed: Apr. 15, 1974

[21] Appl. No.: 460,708

[30] Foreign Application Priority Data
May 16, 1973  United Kingdom............... 23357/73

[52] U.S. Cl. ............... 428/113; 156/167; 156/181; 264/DIG. 81; 428/134; 428/137; 428/198
[51] Int. Cl.² ............................................ A63J 7/00
[58] Field of Search ............ 161/57, 58, 59, 89, 92, 161/104, 112, 113, DIG. 6; 156/166, 167, 180, 181, 229; 264/DIG. 81; 428/131, 137, 255, 105, 107, 113

[56] References Cited
UNITED STATES PATENTS

| | | | |
|---|---|---|---|
| 2,102,746 | 12/1937 | Reilly............................. | 161/DIG. 6 |
| 3,137,746 | 6/1964 | Seymour et al................ | 161/DIG. 6 |
| 3,215,149 | 11/1965 | Weinberg....................... | 161/DIG. 6 |
| 3,386,876 | 6/1968 | Wyckoff......................... | 161/DIG. 6 |
| 3,387,077 | 6/1968 | Sammons et al............... | 161/DIG. 6 |
| 3,501,366 | 3/1970 | Bramley et al................. | 161/109 |
| 3,616,154 | 10/1971 | Dow et al. .................... | 161/113 |

Primary Examiner—George F. Lesmes
Assistant Examiner—James J. Bell
Attorney, Agent, or Firm—Woodhams, Blanchard and Flynn

[57] ABSTRACT

Netting of small net size is economically made by forming a network of crossing longitudinal and transverse threads, bonding the threads together at the crossings by individually moulded buttons of thermoplastic material and moulding small masses of thermoplastic material (which may or may not be the buttons at the crossings) bearing integrally moulded elements radiating towards the centres of the mesh openings. The radiating elements may terminate close to one another or be joined together by an integrally moulded boss in the central region of each mesh opening. The radiating elements effectively block the mesh openings or divide them up into smaller openings without requiring correspondingly large and possibly excessive lengths of threads. The netting is suitable for security purposes, for example at expositions.

7 Claims, 3 Drawing Figures

COMPOSITE NET

The present invention relates to nets and netting and provides a new net structure of value for certain purposes.

In the specification of my Pat. No. 3,608,034 there is described and claimed netting suitable for making up into nets for conventional purposes, composed of regularly arranged flexible threads which consist of or contain thermoplastic filaments, the threads being joined to one another to form netting by masses of plastics material individually moulded and bonded to each thread at each thread junction.

Such netting can be made of various mesh sizes, depending on the spacing of the longitudinal threads and of the transverse threads that go to make up the net, although each mesh size requires its own particular spacing of the moulding dies and hence a separate machine or a machine specially constructed to be adaptable to more than one mesh size. Smaller mesh sizes, however, consume correspondingly greater quantities of thread and require correspondingly more closely spaced dies, both of which consequences can be disadvantageous.

In accordance with this invention netting comprises spaced longitudinal threads and spaced transverse threads crossing the longitudinal threads, the threads being joined together where they cross by buttons or small masses of thermoplastic material individually moulded about each thread crossing, and elements of thermoplastic material formed integrally with buttons or small masses of the same material moulded on the threads and radiating therefrom towards the centres of the mesh openings.

The radiating elements will usually be formed on the buttons or thermoplastic masses which bond the thread crossings. Alternatively, thermoplastic masses may be moulded onto individual threads between the crossings with elements radiating from such masses. Both of these arrangements may, of course, be present in the same netting.

The inwardly radiating elements may terminate more or less close to one another in the central region of each mesh opening. Alternatively, they may join together in a central boss formed integrally with all the elements in the same mesh.

The inwardly radiating elements can readily be formed by suitably formed moulding heads, channels or runners of desired cross-section radiating from the cavities in which the thermoplastic masses are moulded. Complementary portions of each channel or runner are formed in the two, usually upper and lower, portions of the die head, as with the bonding mass cavities.

The invention will be further described, by way of example, with reference to the accompanying drawing, in which.

Figure 1:
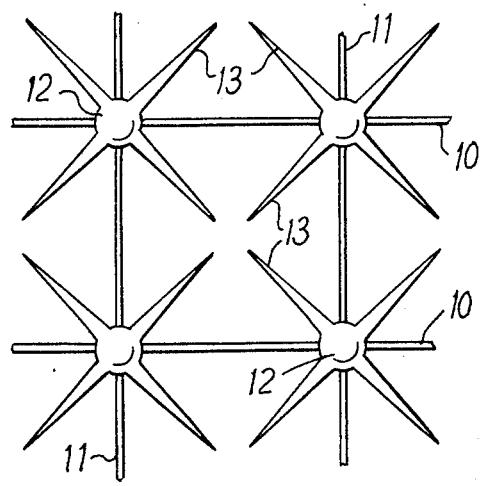
FIG. 1 is a plan view of one form of netting embodying the invention.

The netting of FIG. 1 consists of longitudinal threads 10 of thermoplastic material, and transverse threads 11 also of thermoplastic material bonded at the thread crossings by moulded masses 12 of thermoplastic material. From each of the masses 12 four tapering elements 13 radiate towards the centre of the respective mesh openings.

The elements 13 not only reduce the free space in the mesh opening but also can serve as a trap to retain an article, or a hand, thrust through the mesh. This form of net can be used for security purposes, for example in exhibitions.

Figure 2:
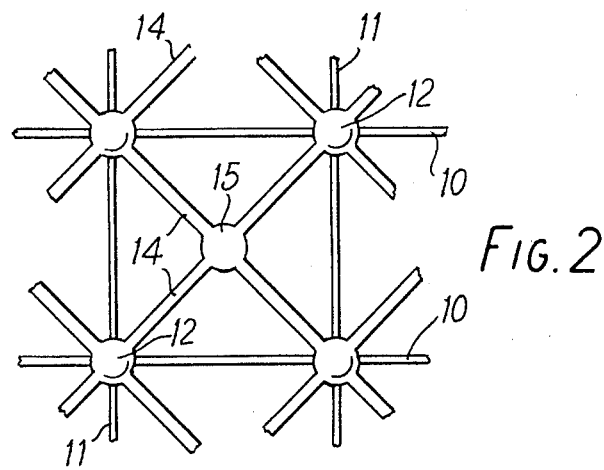
FIG. 2 is a similar view of a second embodiment of the invention.

In FIG. 2 is shown netting in which the masses 12 are formed with elements 14 that meet in the centre of each mesh opening in an integral boss 15. This quarters the mesh size of the net but at relatively little additional expense and uses much less material than would a net employing double the number of threads at half the spacing in each direction.

Figure 3:
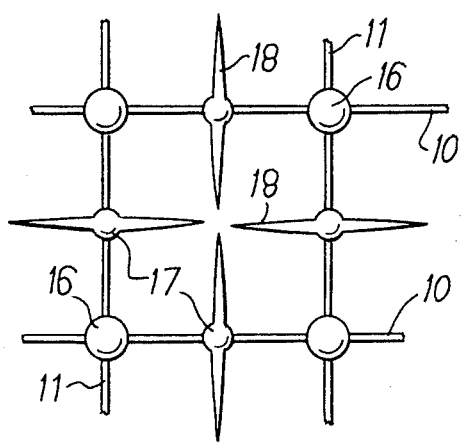
FIG. 3 is a similar view of a third embodiment of the invention.

In FIG. 3 the netting shown has the usual bonding masses 16 at the thread crossings, which in this case carry no integral inwardly radiating elements, although in another embodiment such elements could be present as well. Instead, further moulded masses 17 are formed on the longitudinal and transverse threads 10 and 11 (or, as an alternative, on one only of these groups of threads) and the further masses are formed with integral elements 18 directed towards the centre of the mesh. Such elements 18 effectively quarter the size of the mesh opening, and can if desired be joined in a central boss after the manner shown in FIG. 2.

As in the case of netting disclosed in Pat. No. 3,608,034, the threads may be formed with a conductive filament, if desired, to provide a net that can be electrified. The conductive threads may be of the form described and claimed in Pat. No. 3,291,987. The netting may then be used, for example, to retain smaller animals. In the case of nets used for security purposes, the net can be connected to an alarm which may, for example, give warning of vibration of the net occasioned by the removal of a hand or other article from the points of the radiating elements 13 in the net of FIG. 1.

The embodiments of the invention in which an exclusive property or privelege is claimed are defined as follows:

1. In a netting of the type having mesh openings respectively bounded by spaced substantially parallel longitudinal threads, spaced substantially parallel transverse threads crossing said longitudinal threads at the corners of the mesh openings, and means interlocking and surrounding the crossing threads comprising buttons of thermoplastic material individually moulded about said thread crossings, the improvement comprising:

means for subdividing said mesh openings comprising unitary subdividing elements of thermoplastic material formed integrally with small masses of the same material, said masses being moulded on the threads, said subdividing elements radiating from said threads toward the centers of the mesh openings;

whereby to produce a netting having substantially closed openings of width substantially less than the parallel thread spacing while retaining the strength provided by said threads and without increasing the number of threads and thread crossing buttons.

2. Netting according to claim 1 wherein said small masses are constituted by said buttons and said moulded elements radiate integrally from said buttons diagonally of and away from said threads.

3. Netting according to claim 1 wherein said small masses are moulded directly onto individual threads between said thread crossings and are isolated from said buttons at least by lengths of said threads.

4. Netting according to claim 1 wherein the moulded radiating elements terminate close to one another in the central region of each mesh opening leaving said central region open.

5. Netting according to claim 1 wherein the radiating elements join together in a central boss moulded integrally with all the elements in the same mesh.

6. Netting according to claim 1 wherein said threads are multifilament threads, two pair of said moulded elements extend into a given mesh opening and are substantially coplanar with the threads bounding said mesh opening, the elements of each pair being substantially coaxial, the axes of said pairs crossing centrally of said mesh opening, said elements having inner ends close spaced from the center of said mesh opening, wherein each mesh opening subdivision is substantially bounded by a pair of mutually angled moulded elements and a segment of at least one of said threads, said elements being unstretched.

7. Netting according to claim 6 wherein the central ends of the moulded elements of a given mesh opening are moulded integrally with a central boss, whereby said improved netting consists of the network of said crossing threads and a superposed self-integral network of said thermoplastic material moulded to said threads and subdividing the thread mesh openings.

* * * * *